US008667472B1

United States Patent
Molinari

(10) Patent No.: US 8,667,472 B1
(45) Date of Patent: Mar. 4, 2014

(54) SYSTEM AND METHOD OF INSTRUMENTING CODE FOR IN-PRODUCTION MONITORING

(75) Inventor: Guy A. Molinari, Renton, WA (US)

(73) Assignee: Disney Enterprises, Inc., Burbank, CA (US)

( * ) Notice: Subject to any disclaimer, the term of this patent is extended or adjusted under 35 U.S.C. 154(b) by 749 days.

(21) Appl. No.: 12/846,571

(22) Filed: Jul. 29, 2010

(51) Int. Cl.
*G06F 9/44* (2006.01)

(52) U.S. Cl.
USPC ............ 717/130; 717/124; 717/127; 717/128

(58) Field of Classification Search
None
See application file for complete search history.

(56) References Cited

U.S. PATENT DOCUMENTS

| | | | | |
|---|---|---|---|---|
| 7,356,803 B2* | 4/2008 | Bau et al. | | 717/116 |
| 7,617,479 B2* | 11/2009 | Hambrick et al. | | 717/104 |
| 7,937,419 B2* | 5/2011 | Ylonen | | 707/813 |
| 8,132,162 B2* | 3/2012 | Peterson | | 717/156 |
| 8,539,452 B2* | 9/2013 | Chapman et al. | | 717/127 |
| 2003/0005181 A1* | 1/2003 | Bau et al. | | 709/330 |
| 2004/0210877 A1* | 10/2004 | Sluiman et al. | | 717/130 |
| 2004/0243979 A1* | 12/2004 | Pugh et al. | | 717/124 |
| 2004/0268314 A1* | 12/2004 | Kollman et al. | | 717/128 |
| 2006/0037004 A1* | 2/2006 | Long et al. | | 717/127 |
| 2006/0294526 A1* | 12/2006 | Hambrick et al. | | 719/315 |
| 2007/0044094 A1* | 2/2007 | Banerjee | | 717/176 |
| 2007/0150877 A1* | 6/2007 | Emmett et al. | | 717/149 |
| 2008/0209404 A1* | 8/2008 | Brady | | 717/128 |
| 2008/0244537 A1* | 10/2008 | Wintergerst et al. | | 717/130 |
| 2009/0013320 A1* | 1/2009 | Peterson | | 718/1 |
| 2009/0064138 A1* | 3/2009 | Arcuri et al. | | 718/1 |
| 2010/0095280 A1* | 4/2010 | Schmelter et al. | | 717/128 |
| 2011/0283264 A1* | 11/2011 | Gagliardi | | 717/130 |
| 2011/0283265 A1* | 11/2011 | Gagliardi et al. | | 717/130 |

OTHER PUBLICATIONS

Guoqing Xu et al., Precise Memory Leak Detection for Java Software Using Container Pro?ling, 2008 ACM, pp. 151-160, <http://ieeexplore.ieee.org/stamp/stamp.jsp?tp=&arnumber=4814126>.*
Milan Jovic et al., Measuring the Performance of Interactive Applications with Listener Latency Pro?ling, 2008 ACM, pp. 137-146, <http://dl.acm.org/citation.cfm?id=1411751>.*
Sewon Moon et al., A Thread Monitoring System for Multithreaded Java Programs, 2006 ACM, pp. 21-29, <http://dl.acm.org/citation.cfm?id=1149985>.*
Darpan Dinker et al., Using Java Method Traces to Automatically Characterize and Model J2EE Server Applications, 2006 IEEE, pp. 1187-1194, <http://ieeexplore.ieee.org/stamp/stamp.jsp?tp=&arnumber=4117734>.*
David Camera et al., Complete Instrumentation Requirements for Performance Analysis of Web Based Technologies, 2003 IEEE, pp. 166-175, <http://ieeexplore.ieee.org/stamp/stamp.jsp?tp=&arnumber=1190243>.*
Jiang Guo et al., A Survey of J2EE Application Performance Management Systems, 2004 IEEE, pp. 724-731, <http://ieeexplore.ieee.org/stamp/stamp.jsp?tp=&arnumber=1314804>.*

\* cited by examiner

*Primary Examiner* — Thuy Dao
*Assistant Examiner* — Cuong V Luu
(74) *Attorney, Agent, or Firm* — Patterson & Sheridan, LLP

(57) ABSTRACT

A system and method configured to instrument code for in-production monitoring provides a polling thread. A main thread executes the code of an instrumented application program and the polling thread executes in the background. Therefore the polling thread does not reduce the performance of the application program execution while monitoring activities are performed. Additionally, the polling thread is configured to simplify the process of instrumenting code for Java management extensions (JMX) by navigating the application program structure to locate administrative objects to bind to JMX and registering the administrative objects with JMX to enable monitoring of the instrumented code.

20 Claims, 4 Drawing Sheets

SYSTEM AND METHOD OF INSTRUMENTING CODE FOR IN-PRODUCTION MONITORING

BACKGROUND

1. Field of the Invention

The present invention relates to the field of instrumenting and monitoring of application programs and, in particular, to a system and method instrumenting code for in-production monitoring.

2. Description of the Related Art

A conventional technique for instrumenting the code of an application program written in the object-oriented language, Java, requires a developer to construct a JavaBean object and then construct a dynamic management "bean" (MBean) that references the JavaBean object using Java management extensions (JMX) application programming interfaces (APIs).

The state of a JavaBean object is stored in variables and the behaviors of the JavaBean object are implemented with methods. Variables are named records in which you can store data for later use. Methods are named pieces of code that implement behaviors the JavaBean object is configured to perform. In object-oriented terminology, each implementation or manifestation of a JavaBean object is an "instance" of the generic class of the object. Each instance of the object has specific state associated with that particular instance, but every instance has the same methods defining its behavior. When created, each JavaBean object has memory allocated to it to hold its instance variables, i.e., the state for the object. Once the JavaBean object is created, the instance methods of the JavaBean may be called to execute the JavaBean object. The JavaBean object exposes one or more specific properties of the application program.

An MBean represents a resource to be managed, such as an application, device or service, and has a management interface consisting of the named and typed attributes that can be read and written, the named and typed operations that can be invoked, and the typed notifications that can be emitted by the MBean. A management tool may be configured to monitor the MBean to change settings, perform an administrative action, or to gather metrics related to the application program. A dynamic MBean is an MBean that defines its management interface at runtime.

An MBean may have an attribute representing a latency property of a calculation performed by the application program. The MBean may be configured to capture timestamps of the property exposed by the JavaBean and a JMX server may be configured to monitor the captured timestamps. In another example, an MBean representing an application program's configuration may have attributes representing the different configuration parameters, such as a cache size. Reading the Cachesize attribute of the MBean returns the current size of the cache. Writing the Cachesize attribute updates the size of the cache, potentially changing the behavior of the running application.

An MBean must be registered in a core managed object server, such as a JMX server before the MBean can be used. An MBean server acts as a management agent, runs on most devices enabled for the Java programming language, and is a repository of MBeans. Each MBean is registered with a unique name within the JMX server. Other objects or application programs do not access an MBean directly, but rather access the MBean by name through the JMX server.

FIG. 1 is a flowchart 100 of method steps describing the operation of a prior art technique for instrumenting code. At step 105 the JavaBean instance is constructed by a developer. At step 110 the developer constructs the dynamic MBean referencing the JavaBean. Steps 105 and 110 may be performed in parallel. At step 115 the developer registers the MBean with a JMX server. The JMX server may then monitor the instrumented application program and at step 120 execution of the application program continues. Importantly, the JMX server interactions to monitor the instrumented application program are performed on the main execution thread. Consequently, the interactions may result in reduced performance of the main execution thread, i.e., the application program. While a reduction in performance may not present a problem when the application program is executed for debug or quality assurance (QA) purposes, a reduction in performance does present a problem when in-production monitoring of the application program is performed.

As the foregoing illustrates, there is a need in the art for an improved technique of instrumenting code for in-production monitoring.

SUMMARY

Embodiments of the invention include a system and method instrumenting code for in-production monitoring. A main thread executes the code of an instrumented application program and a polling thread executes in the background. The polling thread is configured to simplify the process of instrumenting code for a management server by navigating the application program structure to locate application (i.e., administrative) objects to bind to the management server and then registering the application objects with the management server to enable monitoring of the instrumented code. With such an architecture, the developer is not burdened with the tasks of constructing a management object to encapsulate the application object and register the management object with the management server. More particularly, in an embodiment of the invention that implements a Java framework, the developer is not burdened with the tasks of constructing an MBean to encapsulate the instance object (JavaBean) and register the MBean with JMX.

One embodiment of the invention provides a computer-implemented method for instrumenting an application program. The method includes executing the application program by a main execution thread of a processor and executing a polling thread by the processor. The polling thread is configured to navigate a graph of the application program to locate an instance of an application object, construct a management object corresponding to the located application object, and register the management object with a management server to produce the instrumented application program.

One advantage of the techniques described herein is that the polling thread executes in the background and therefore does not reduce the performance of the application program execution while monitoring activities are performed.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
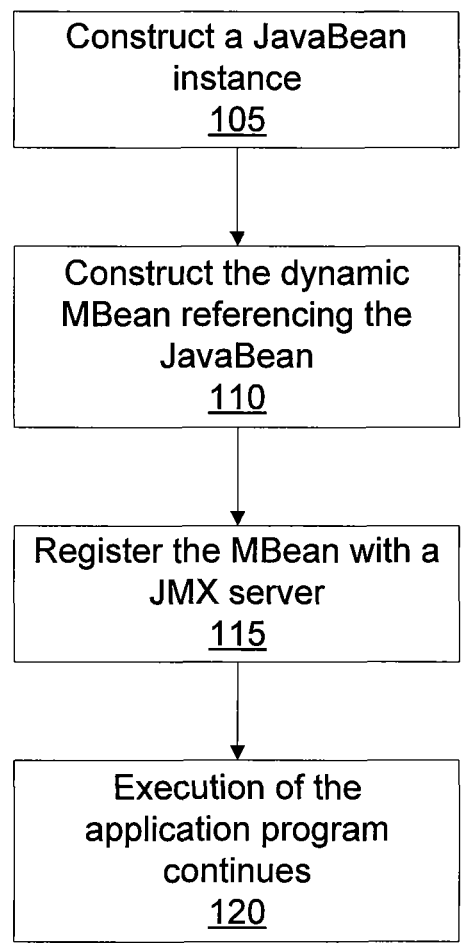
FIG. 1 is a flowchart of method steps describing the operation of a prior art technique for instrumenting code.

A polling thread is used to simplify the process of instrumenting code for JMX by navigating the application program structure to locate administrative objects to bind to JMX and registering the administrative objects with JMX to enable monitoring of the instrumented code. The main thread executes the instrumented application program and the polling thread executes in the background so that performance of the main thread is not negatively impacted by the monitoring functions. Therefore, the application program may be monitored during the QA process and also during in-production. The developer inserts information into the application program that is used by the polling thread to encapsulate the JavaBean into an MBean. The polling thread then registers the MBean with JMX and maintains an inventory of registered MBeans.

In one embodiment, a developer provides information to the poller using annotations in the application program. Examples of annotations include @JMXEntryPoint, @BindToMBean, and @ExposeToJMX. The @JMXEntryPoint annotation is primarily a marker that flags the entry point for the polling thread and returns an instance of a profiler object (JavaBean). The @BindToMBean annotation marks an object instance of interest. As the "poller" thread traverses the object graph starting with the entry point, the poller looks for @BindToMBean annotations and registers an MBean passing the object of interest. The annotated method must return the target object. The @ExposeToJMX annotation indicates the interesting properties and functions of the bound object. The annotations are generally "getter" methods that return the target objects. The reset( )method is an example of an action that can be executed, i.e., a function. The reset( )method provides the ability for an external tool to clear the statistics counters and reset them to some initial state.

The class shown in TABLE 1 is an example of a code functioning as a mediator for handling all profiler statistics gathering and event handling for an application program.

TABLE 1

```
public class InvocationProfiler implements java.io.Serializable {
    private static InvocationProfiler mInstance;
    private Map<Stats, Stats>mStatsMap = new ConcurrentHashMap( );
    public InvocationProfiler( ) {
        mInstance = this;
    }
    @JMXEntryPoint
    @BindToMBean(name = "SFProfiler", displayName = "Service Framework Profiler",
            description = "Service Framework Profiler")
    public static InvocationProfiler getInstance( ) {
        return mInstance;
    }
    @BindToMBean(name = "statistics", displayName = "Invocation statistics",
            description = "Invocation statistics")
    public Stats[ ] getStatistics( ) {
        List<Stats> sl = new ArrayList( );
        for (Map.Entry<Stats, Stats> e : mStatsMap.entrySet( ))
            sl.add(e.getValue( ));
        return sl.toArray(new Stats[sl.size( )]);
    }
    public Map<Stats, Stats>getStatisticsMap( ) {
        return mStatsMap;
    }
    @ExposeToJMX(name = "reset", operation = true, displayName = "resetStats",
            description = "Reset counters")
    public void reset( ) {
        mStatsMap = new ConcurrentHashMap( );
    }
    public Stats getStatistics(String caller, String callee) {
        Stats 1 = new Stats(caller, callee);
        return mStatsMap.get(1);
    }
    public void invokedEvent(String caller, String callee, long elapsedTime) {
        Stats 1= new Stats(caller, callee);
        Stats stats = mStatsMap.get(1);
        if (stats == null) {
            stats = 1;
            mStatsMap.put(stats, stats);
        }
        stats.incCumulativeServiceTime(elapsedTime);
        if (elapsedTime > stats.getPeakServiceDuration( ))
            stats. setPeakServiceDuration(elapsedTime);
        stats.incServicedCount( );
    }
    public long currentTime( ) {
        return System.nanoTime( );
    }
```

TABLE 1-continued

```
public class Stats implements java.io.Serializable {
    private AtomicLong mPeakServiceDuration = new AtomicLong(0L);
    private AtomicLong mCumulativeServiceTime = new AtomicLong(0L);
    private AtomicLong mServicedCount = new AtomicLong(0L);
    private String mCallee = null;
    private String mCaller = null;
    public Stats(String caller, String callee) {
        mCaller = caller;
        mCallee = callee;
    }
    @ExposeToJMX(name = "callee", key = true, displayName = "callee",
        description = "Called method")
    public String getCallee( ) {return mCallee; }
    @ExposeToJMX(name = "caller", key = true, displayName = "caller",
        description = "Calling method")
    public String getCaller( ) { return mCaller; }
    @ExposeToJMX(name = "servicedCount", displayName = "servicedCount",
        description = "Serviced Count")
    public long getServicedCount( ) {return mServicedCount.get( ); }
    public void incServicedCount( ) {mServicedCount.getAndIncrement( ); }
    public void setServicedCount(long servicedCount) {
        mServicedCount.set(servicedCount); }
    @ExposeToJMX(name = "cumulativeServiceTime", displayName =
        "cumulativeServiceTime", description = "Cumulative Service Time")
    public long getCumulativeServiceTime( ) {return mCumulativeServiceTime.get( ); }
    public void incCumulativeServiceTime(long elapsedTime) {
        mCumulativeServiceTime.getAndAdd(elapsedTime); }
    @ExposeToJMX(name = "avgServiceTime", displayName = "avgServiceTime",
        description = "Average Service Time")
    public double getAverageServiceDuration( ) {
        double avg = mServicedCount.get( ) == 0L ? (double)
            mCumulativeServiceTime.get( ) :
            (double) (mCumulativeServiceTime.get( ) / mServicedCount.get( ));
        return avg / 1000000;
    }
    @ExposeToJMX(name = "peakServiceDuration", displayName =
        "peakServiceDuration", description = "Peak Service Duration")
    public long getPeakServiceDuration( ) { return mPeakServiceDuration.get( ) / 1000000; }
    public void setPeakServiceDuration(long peakServiceDuration) {
        mPeakServiceDuration.lazySet(peakServiceDuration);
    }
    @ExposeToJMX(name = "profiler", displayName = "profiler", description =
        "Reference to parent")
    public InvocationProfiler getProfiler( ) { return InvocationProfiler.this; }
    }
}
```

Figure 2A:
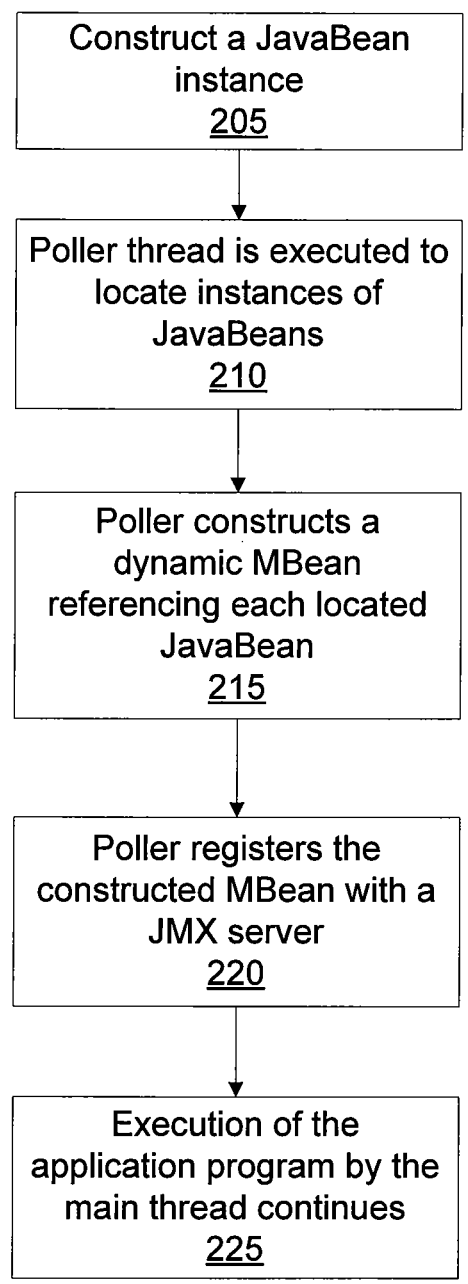
FIG. 2A is a flowchart of method steps describing the operation of a technique for instrumenting code for in-production monitoring, according to one embodiment of the invention.

FIG. 2A is a flowchart 200 of method steps describing the operation of a technique for instrumenting code for in-production monitoring, according to one embodiment of the invention. Although the method steps shown in flowchart 200 are described in the context of a Java framework, in other embodiments of the invention, the steps may be performed in a different framework using an application object, management object, and a management server that are specific to that different framework. At step 205 the JavaBean instance is constructed by a developer. At step 210 the poller thread is executed to navigate the graph starting at the @JMXEntryPoint and locate instances of JavaBeans indicated by @BindToMBean. At step 215 the poller thread constructs a dynamic MBean referencing each located JavaBean. When constructing the MBean the poller exposes the properties and functions indicated by @ExposeToJMX.

At step 220 the poller registers the constructed MBean with a JMX server. The JMX server may then monitor the instrumented application program. Steps 210, 215, and 220 may be performed in periodically by the poller to maintain an inventory of the registered MBeans. At step 225 the execution of the application program by the main thread continues. The main thread may execute asynchronously with the poller thread. In contrast with conventional methods, the JMX server interactions to monitor the instrumented application program are performed on the poller execution thread instead of on the main thread. Consequently, the interactions do not result in reduced performance of the main execution thread, i.e., the application program. The poller thread allows for instrumenting of the application program for debug or quality assurance (QA) purposes as well as for in-production monitoring.

The poller thread maintains an inventory of the registered MBeans, registering new MBeans as they are constructed and removing MBeans that were constructed for JavaBeans that disappear. When multiple objects of the same type are used, the poller uses a unique name, e.g., a JMX object name, for each one of the multiple objects.

Figure 2B:
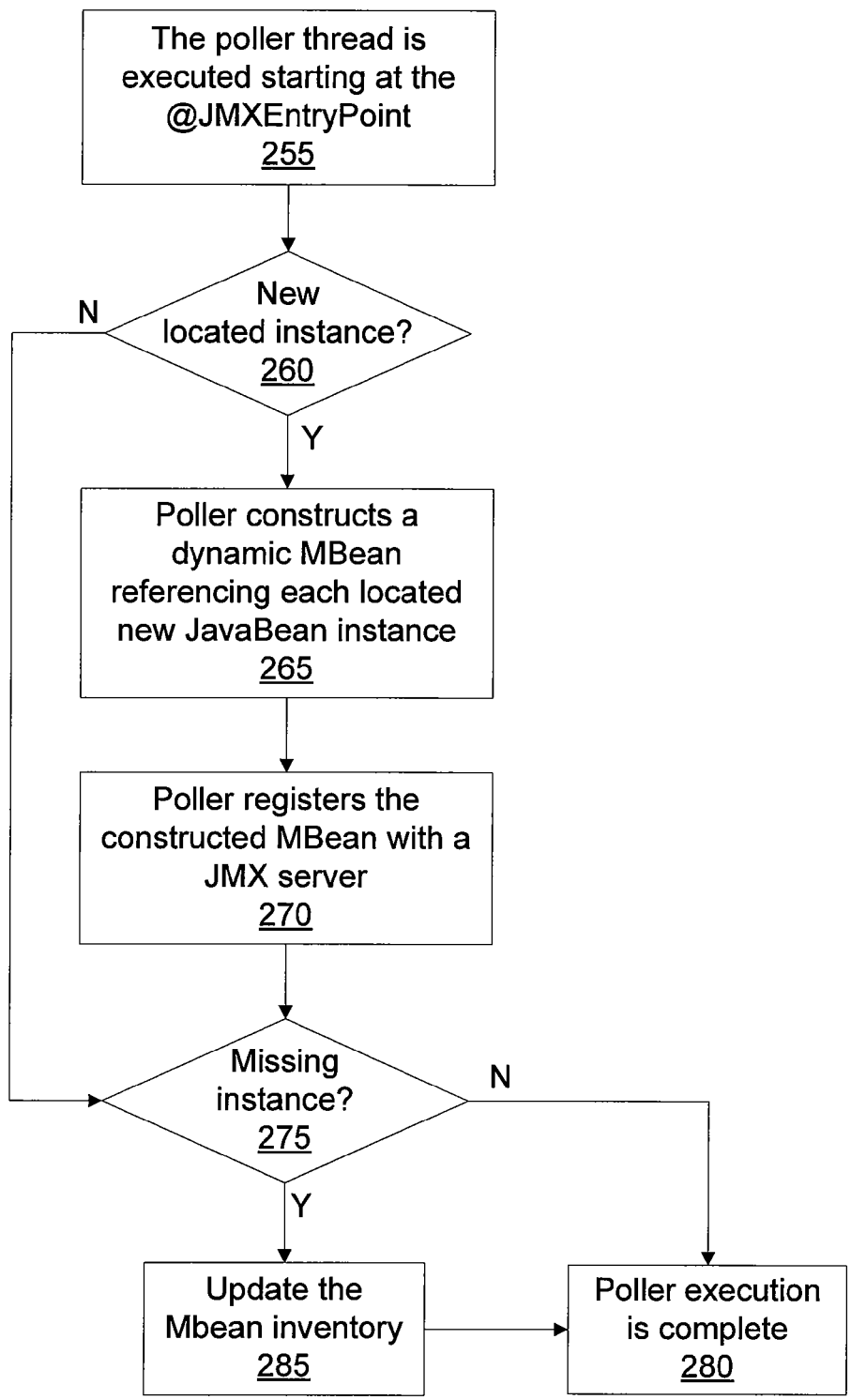
FIG. 2B is a flowchart of method steps describing the operation of the poller execution thread, according to one embodiment of the invention.

FIG. 2B is a flowchart 250 of method steps describing the operation of the poller execution thread, according to one embodiment of the invention. The method steps shown in FIG. 2B may be executed periodically in order for the poller to maintain an inventory of the MBeans. Although the method steps shown in flowchart 250 are described in the context of a Java framework, in other embodiments of the invention, the steps may be performed in a different framework using an application object, management object, and a management server that are specific to that different framework. At step 255 the poller thread is executed to navigate a graph of the application program structure starting at the @JMXEntryPoint and locate instances of JavaBeans indicated by @BindToMBean. At step 260 the poller thread determines if any of the located instances are new, and, if not the poller thread proceeds directly to step 275. Otherwise, at step 265 the poller thread constructs a dynamic MBean referencing each new instance. At step 270 the poller registers the newly constructed MBean with a JMX server.

At step 275 the poller thread determines if any previously registered MBeans in the inventory maintained by the poller thread correspond to instances of JavaBeans that are missing (i.e., no longer exist) in the application program. If none of the previously registered MBeans correspond to JavaBeans that are missing, then at step 280 the poller thread execution is complete. Otherwise, at step 285 the inventory is updated to remove each previously registered MBean that corresponds to a missing JavaBean.

The application program to be monitored and the poller thread for instrumenting the application program each comprise an ordered listing of executable instructions for implementing logical functions. The application program and the poller thread can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 3:
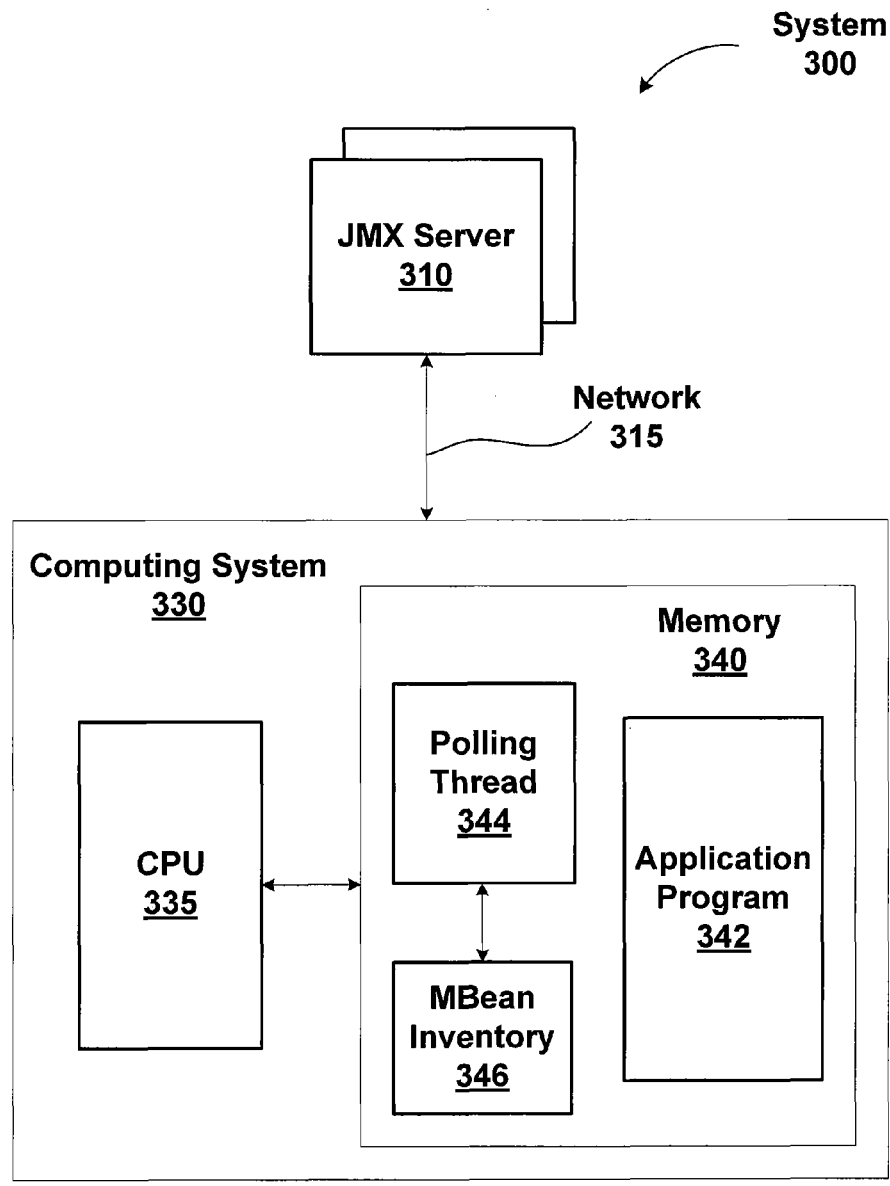
FIG. 3 is a block diagram of a system configured to implement one or more aspects of the present invention.

FIG. 3 is a block diagram of a system 300 configured to implement one or more aspects of the present invention. The system 100 includes a one or more JMX servers 310, a network 315, and one or more computing systems 330. The computing system 330 includes a central processing unit (CPU) 335 that is coupled to a memory 340. The memory 340 stores an application program 342 that includes one or more JavaBean instances defining properties and/or functions to be monitored during execution of the application program 342. The memory 340 also includes a polling thread 344 and an MBean inventory 346 that is maintained by the polling thread. Although the system 300 is described in the context of a Java framework, in other embodiments of the invention, the JMX server 310 may be replaced with a management server that is specific to a different framework, and the MBean inventory 346 may be replaced with a management object inventory that also is specific to the different framework. Similarly, the JavaBean instances included in the application program 342 may be replaced with application objects that are specific to the different framework too.

One advantage of the systems and methods described herein is that the polling thread executes in the background and, therefore, does not reduce the performance of the application program execution while monitoring activities are performed. Additionally, the polling thread is configured to simplify the process of instrumenting code for JMX by navigating the application program structure to locate JavaBeans to bind to JMX, exposing the JavaBeans using MBeans, and registering the MBeans with JMX to enable monitoring of the instrumented code.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for instrumenting an application program using separate threads, the method comprising:
   executing the application program via a first execution thread of a processor; and
   executing, in a background thread separate from the first execution thread, a polling thread within the processor, wherein the polling thread is configured to:
   maintain an object graph of the application program, the object graph comprising a set of application objects in use by the application program;
   identify a first annotation specifying a navigation entry point of the object graph of the application program and returning an instance of a profiler object;
   navigate, starting from the navigation entry point, the object graph of the application program in order to locate an instance of an application object, of the set of application objects;
   identify a property and a function of the instance of the application object to be monitored by the polling thread, wherein the property and the function are specified by a second annotation within the application program;
   construct a management object referencing the located instance of the application object; and
   register the management object with a management server to produce the instrumented application program configured to monitor the property and the function of the application object while executing the application program.

2. The method of claim 1, wherein the polling thread is further configured to construct the management object to expose the property and the function of the instance of the application object.

3. The method of claim 2, wherein the polling thread is executed periodically.

4. The method of claim 3, wherein the polling thread maintains an inventory of management objects that are registered with the management server, wherein the first annotation and the second annotation are not commented portions of a source code of the application program.

5. The method of claim 4, further comprising:
   determining that a previously registered management object no longer exists; and
   removing the previously registered management object from the inventory.

6. The method of claim 5, wherein the management server is further configured to monitor the instrumented application program during in-production execution of the instrumented application program, wherein the polling thread is executed separate from the main thread in order to not reduce performance of the application program executing on the first execution thread.

7. The method of claim 6, wherein the application object is a JavaBean object, the management object is an MBean, and the management server is a Java Management Extensions (JMX) server.

8. A non-transitory computer-readable storage medium storing instructions that, when executed by a processor, cause a computer system to instrument an application program using separate threads, by performing the steps of:
   executing the application program by a main execution thread of the processor; and
   executing, in a background thread separate from the first execution thread, a polling thread by the processor, wherein the polling thread is configured to:
   maintain an object graph of the application program, the object graph comprising a set of application objects in use by the application program;
   identify a first annotation specifying a navigation entry point of the object graph of the application program and returning an instance of a profiler object;
   navigate, starting from the navigation entry point, the object graph of the application program in order to locate an instance of an application object, of the set of application objects;
   identify a property and a function of the instance of the application object to be monitored by the polling thread, wherein the property and the function are specified by a second annotation within the application program;
   construct a management object referencing the located instance of the application object; and
   register the management object with a management server to produce the instrumented application program configured to monitor the property and the function of the application object while executing the application program.

9. The non-transitory computer-readable storage medium of claim 8, wherein the polling thread is further configured to construct the management object to expose the property and the function of the instance of the application object.

10. The non-transitory computer-readable storage medium of claim 9, wherein the polling thread is executed periodically.

11. The non-transitory computer-readable storage medium of claim 10, wherein the polling thread maintains an inventory of management objects that are registered with the management server, wherein the first annotation and the second annotation are not commented portions of a source code of the application program.

12. The non-transitory computer-readable storage medium of claim 11, further comprising:
   determining that a previously registered management object no longer exists; and
   removing the previously registered management object from the inventory.

13. The non-transitory computer-readable storage medium of claim 12, wherein the management server is further configured to monitor the instrumented application program during in-production execution of the instrumented application program, wherein the polling thread is executed separate from the main thread in order to not reduce performance of the application program executing on the first execution thread.

14. The non-transitory computer-readable storage medium of claim 13, wherein the application object is a JavaBean object, the management object is an MBean, and the management server is a Java Management Extensions (JMX) server.

15. A system for instrumenting an application program, the system comprising:
   a memory configured to store the application program and a polling thread; and
   a processor coupled to the memory and configured to:
   execute the application program by a main execution thread; and
   execute, in a background thread separate from the first execution thread, the polling thread, wherein the polling thread is configured to:
   maintain an object graph of the application program, the object graph comprising a set of application objects in use by the application program;
   identify a first annotation specifying a navigation entry point of the object graph of the application program and returning an instance of a profiler object;
   navigate, starting from the navigation entry point, the object graph of the application program in order to locate an instance of an application object, of the set of application objects;
   identify a property and a function of the instance of the application object to be monitored by the polling thread, wherein the property and the function are specified by a second annotation within the application program;
   construct a management object referencing the located instance of the application object; and
   register the management object with a management server to produce the instrumented application program configured to monitor the property and the function of the application object while executing the application program.

16. The system of claim 15, wherein the application object is a JavaBean object, the management object is an MBean, and the management server is a Java Management Extensions (JMX) server.

17. The system of claim 16, wherein the polling thread is further configured to construct the management object to expose the property and the function of the instance of the application object, wherein the polling thread is executed periodically.

18. The system of claim 17, wherein the polling thread maintains an inventory of management objects that are registered with the management server, wherein the first annotation and the second annotation are not commented portions of a source code of the application program.

19. The system of claim 18, the processor further configured to:
   determine that a previously registered management object no longer exists; and
   remove the previously registered management object from the inventory.

20. The system of claim 19, wherein the management server is further configured to monitor the instrumented application program during in-production execution of the instrumented application program, wherein the polling thread is executed separate from the main thread in order to not reduce performance of the application program executing on the first execution thread.

* * * * *